(12) United States Patent
Sugano et al.

(10) Patent No.: US 9,227,604 B2
(45) Date of Patent: Jan. 5, 2016

(54) TRAVEL CONTROL DEVICE AND TRAVEL CONTROL METHOD

(71) Applicant: NISSAN MOTOR CO., LTD., Kanagawa (JP)

(72) Inventors: Takeshi Sugano, Yokohama (JP); Toshimichi Gokan, Machida (JP); Masahiro Kobayashi, Novi, MI (US)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/378,436

(22) PCT Filed: Feb. 7, 2013

(86) PCT No.: PCT/JP2013/052825
§ 371 (c)(1),
(2) Date: Aug. 13, 2014

(87) PCT Pub. No.: WO2013/121961
PCT Pub. Date: Aug. 22, 2013

(65) Prior Publication Data
US 2015/0057918 A1    Feb. 26, 2015

(30) Foreign Application Priority Data

Feb. 14, 2012   (JP) .................................. 2012-029269

(51) Int. Cl.
*G06F 17/10* (2006.01)
*B60T 8/1755* (2006.01)
(Continued)

(52) U.S. Cl.
CPC ............... *B60T 8/17558* (2013.01); *B60T 7/22* (2013.01); *B60W 30/18036* (2013.01); *B60W 50/14* (2013.01); *B62D 15/0295* (2013.01);
(Continued)

(58) Field of Classification Search
CPC .......... G01S 2013/9317; G01S 13/931; G01S 13/93; G08G 1/167; G08G 1/168
See application file for complete search history.

(56) References Cited

U.S. PATENT DOCUMENTS

2008/0094193 A1\*   4/2008   Li ................................. 340/435
2010/0271238 A1    10/2010   Reed et al.
(Continued)

FOREIGN PATENT DOCUMENTS

DE           102009047066 A1    5/2011
JP           2010-030514 A       2/2010

OTHER PUBLICATIONS

Communication and Extended European Search Report, dated Feb. 18, 2015, from the corresponding European Patent Application No. 13749572.7.

*Primary Examiner* — Michael D Lang
(74) *Attorney, Agent, or Firm* — Young Basile

(57) ABSTRACT

A travel control device includes a side obstacle detection unit which divides a range from a lateral side to a rear side of a vehicle into plural detection angle areas, and detects, for each of the plural detection angle areas, an obstacle entering the detection angle area; a rearward movement preparation detection unit which detects the vehicle preparing to move rearward; a warning control unit which provides warning about the obstacle if the distance to the obstacle is equal to or less than an activation threshold for the warning; and a threshold control unit which, if the obstacle is detected in one or more rear side areas among the plural detection angle areas, before being detected in the other detection angle areas, raises the activation threshold so that the timing of the warning becomes earlier.

7 Claims, 8 Drawing Sheets

(51) Int. Cl.
    *B60T 7/22*     (2006.01)
    *G08G 1/16*     (2006.01)
    *G01S 7/481*     (2006.01)
    *G01S 13/93*     (2006.01)
    *B60W 50/14*     (2012.01)
    *B60W 30/18*     (2012.01)
    *B62D 15/02*     (2006.01)
    *G01S 13/86*     (2006.01)
    *G01S 15/87*     (2006.01)
    *B60W 50/00*     (2006.01)
    *G01S 15/93*     (2006.01)
    *G01S 13/87*     (2006.01)

(52) U.S. Cl.
    CPC .............. *G01S7/4816* (2013.01); *G01S 13/862* (2013.01); *G01S 13/931* (2013.01); *G01S 15/876* (2013.01); *G01S 15/931* (2013.01); *G08G 1/166* (2013.01); *G08G 1/168* (2013.01); *B60T 2201/022* (2013.01); *B60T 2230/08* (2013.01); *B60W 2050/0075* (2013.01); *G01S 13/87* (2013.01); *G01S 2013/9314* (2013.01); *G01S 2013/9317* (2013.01); *G01S 2013/9332* (2013.01); *G01S 2013/9353* (2013.01); *G01S 2013/9357* (2013.01); *G01S 2013/9375* (2013.01); *G01S 2013/9378* (2013.01); *G01S 2013/9385* (2013.01); *G01S 2013/9389* (2013.01); *G01S 2015/932* (2013.01); *G01S 2015/938* (2013.01); *G08G 1/167* (2013.01)

(56) References Cited

U.S. PATENT DOCUMENTS

| | | |
|---|---|---|
| 2011/0175714 A1 | 7/2011 | Kobayashi et al. |
| 2013/0033371 A1 | 2/2013 | Schliemann et al. |

\* cited by examiner

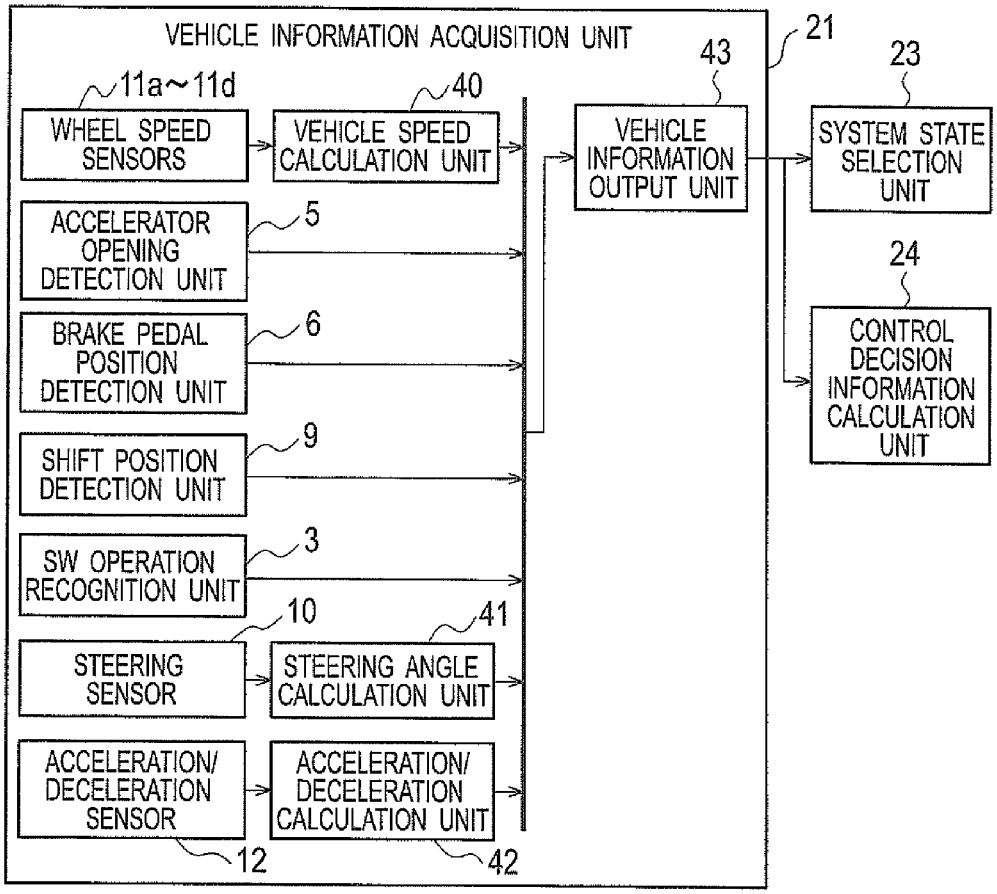
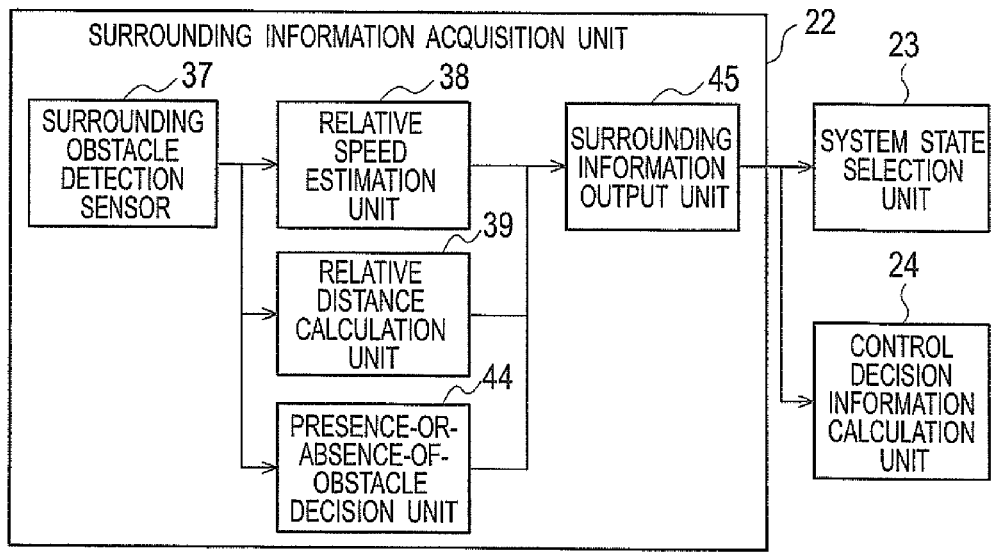

TRAVEL CONTROL DEVICE AND TRAVEL CONTROL METHOD

CROSS REFERENCE TO RELATED APPLICATION

The present application claims priority to Japanese Patent Application No. 2012-029269, filed Feb. 14, 2012 and incorporated herein in its entirety.

TECHNICAL FIELD

The present invention relates to a travel control device and a travel control method.

BACKGROUND

A technique for a vehicle to detect a distance to an approaching vehicle approaching the vehicle by using an obstacle sensor mounted on the vehicle has heretofore been known.

For example in Japanese Patent Application Publication No. 2010-30514, a braking force is applied to the vehicle when the distance between the vehicle and the approaching vehicle is shortened to a predetermined braking control activation distance or less, and the braking control activation distance is set according to an angle formed by a travel direction of the vehicle and an extending direction of a road along which the approaching vehicle is running.

SUMMARY

However, the technique disclosed in Patent Literature 1 cannot set the braking control activation distance in a situation where the angle formed by the travel direction of the vehicle and the extending direction of the road along which the approaching vehicle is running is not clearly determined.

The present invention has been made in view of the foregoing problem. An object of the present invention is to provide a travel control device and a travel control method which reduce a driver's uneasy feeling about the timing of warning when a vehicle moves rearward from its position parked obliquely relative to a driving lane.

A travel control device according to a first aspect of the present invention includes a side obstacle detection unit, a rearward movement preparation detection unit, a warning unit, a warning control unit, and a threshold control unit. The side obstacle detection unit divides a range from a lateral side to a rear side of a vehicle into plural detection angle areas, and detects, for each of the plural detection angle areas, an obstacle entering the detection angle area and a distance to the obstacle. The rearward movement preparation detection unit detects the vehicle preparing to move rearward. The warning unit provides warning about the obstacle detected by the side obstacle detection unit. The warning control unit controls the warning unit so that the warning is provided if the distance to the obstacle detected by the side obstacle detection unit is equal to or less than an activation threshold for the warning. If the rearward movement preparation detection unit detects the vehicle preparing to move rearward and the obstacle is detected in a predetermined detection angle area including one or more rear side areas among the plural detection angle areas, before being detected in the other detection angle areas, the threshold control unit raises the activation threshold so that the timing of the warning becomes earlier than if the obstacle is detected first in the other detection angle areas.

A travel control method according to a second aspect of the present invention using a travel control device including the side obstacle detection unit, the rearward movement preparation detection unit, and the warning unit includes controlling the warning unit so that the warning is provided if the distance to the obstacle detected by the side obstacle detection unit is equal to or less than an activation threshold for the warning, and, if the rearward movement preparation detection unit detects the vehicle preparing to move rearward and the obstacle is detected in a predetermined detection angle area including one or more rear side areas among the plural detection angle areas, before being detected in the other detection angle areas, raising the activation threshold so that the timing of the warning becomes earlier than when the obstacle is detected first in the other detection angle areas.

BRIEF DESCRIPTION OF DRAWINGS

FIG. 3 is a block diagram illustrating a specific example of a configuration of a vehicle information acquisition unit 21 of FIG. 2.

FIG. 4 is a block diagram illustrating a specific example of a configuration of a surrounding information acquisition unit 22 of FIG. 2.

DESCRIPTION OF EMBODIMENTS

Figure 1:
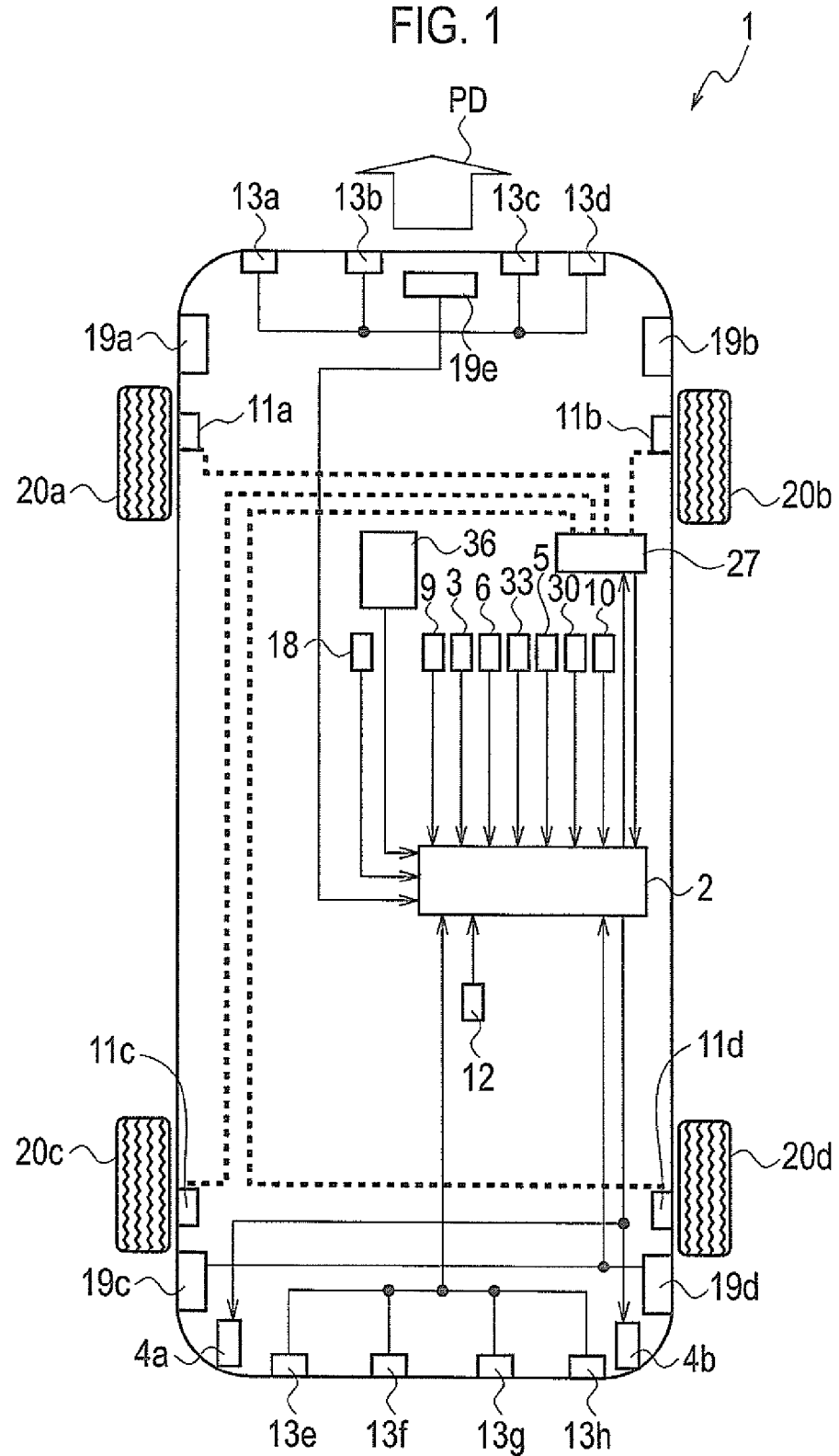
FIG. 1 is a schematic view illustrating an example of a vehicle layout of a travel control device according to an embodiment.

An embodiment of the present invention will be described below with reference to the drawings. In the disclosures of the drawings, the same portions are designated by the same reference characters.

[Travel Control Device]

Description will be given with reference to FIG. 1 with regard to an example of a vehicle layout of a travel control device according to an embodiment. A vehicle 1 is mounted with brake lamps 4a, 4b, an ignition switch 18 which provides commands to start and stop a driving force generation device including an engine and a motor, front obstacle detection sensors 13a to 13d, 19e which detect an obstacle approaching a front side PD of the vehicle 1, rear obstacle detection sensors 13e to 13h which detect an obstacle approaching a rear side of the vehicle 1, side obstacle detection sensors 19a to 19d which detect an obstacle approaching lateral sides of the vehicle 1, a driving force generation device 36 which generates a driving force for the vehicle, a braking force generation device 27, an accelerator pedal manipulation reaction force generation device 30, an alarm device 33 which alerts a driver that an obstacle is approaching, and a vehicle control device 2 which controls the overall vehicle 1.

The front obstacle detection sensors 13a to 13d are installed for example in a front bumper of the vehicle 1, and the rear obstacle detection sensors 13e to 13h are installed for example in a rear bumper of the vehicle 1. Sonar detectors which use ultrasonic waves to detect an obstacle entering a region relatively in the vicinity of the vehicle 1 and a distance to the obstacle can be used as the front obstacle detection sensors 13a to 13d and the rear obstacle detection sensors 13e to 13h. The side obstacle detection sensors 19a to 19d are arranged respectively one on each of left and right fenders of the vehicle 1 on the front side PD and the rear side, and the front obstacle detection sensor 19e is installed for example in the front bumper of the vehicle 1. Radar detectors which use electromagnetic waves to detect an obstacle entering a region relatively far away from the vehicle 1 and a distance to the obstacle can be used as the side obstacle detection sensors 19a to 19d and the front obstacle detection sensor 19e. The vehicle control device 2 is configured by a processing unit such as an ECU (Engine Control Unit), and a CPU (Central Processing Unit) in the processing unit executes a previously stored computer program thereby to control operation of the overall vehicle 1.

A configuration of the travel control device according to the embodiment will be described with reference to FIG. 2. The travel control device according to the embodiment includes a vehicle information acquisition unit 21 which acquires information on the vehicle 1, a surrounding information acquisition unit 22 which acquires information on the surroundings of the vehicle, a system state selection unit 23, a control decision information calculation unit 24, and a warning device which issues a warning to an obstacle detected by the surrounding information acquisition unit 22. Here, the warning device includes a braking force generation system (25 to 27) which generates a braking force to give the warning of the approach of the obstacle, an accelerator pedal manipulation reaction force generation system (28 to 30) which generates an accelerator pedal manipulation reaction force to give the warning of the approach of the obstacle, an alarm system (31 to 33) which gives an alarm to the driver to give the warning of the approach of the obstacle, and a driving force generation system (34 to 36) which performs driving force control to give the warning of the approach of the obstacle.

As illustrated in FIG. 3, the vehicle information acquisition unit 21 includes wheel speed sensors 11a to 11d installed on wheels 20a to 20d, respectively, of the vehicle 1, an accelerator opening detection unit 5 installed on an accelerator pedal of the vehicle 1, a brake pedal position detection unit 6 which detects the position of a brake pedal of the vehicle 1, a shift position detection unit 9 (or a rearward movement preparation detection unit) which detects the shift position of the vehicle 1, an SW operation recognition unit 3 which detects the state of an on-off switch for the travel control device, a steering sensor 10 which detects a steering angle of a steering wheel of the vehicle 1, and an acceleration/deceleration sensor 12 which detects acceleration or deceleration of the vehicle 1.

The wheel speed sensors 11a to 11d detect rotation speeds of the wheels 20a to 20d, respectively, of the vehicle 1. A vehicle speed calculation unit 40 calculates a vehicle speed (or a wheel speed) from the rotation speeds of the wheels 20a to 20d, taking into account a radius of rotation of the wheels 20a to 20d. Further, the vehicle speed calculation unit 40 calculates a travel distance by integrating the vehicle speed. The brake pedal position detection unit 6 detects whether or not the driver is depressing the brake pedal, and detects the amount of depression of the brake pedal. The shift position detection unit 9 detects the state of the shift position in order to detect the present state of a transmission. An example of detection of the vehicle 1 preparing to move rearward includes detection of a rearward movement (R) position by the shift position detection unit 9. The SW operation recognition unit 3 detects the switch state of the travel control device and the switch state of the ignition switch 18. A steering angle calculation unit 41 performs filtering processing on the steering angle of the steering wheel detected by the steering sensor 10, as needed. An acceleration/deceleration calculation unit 42 performs filtering processing on the acceleration or deceleration of the vehicle 1 detected by the acceleration/deceleration sensor 12, as needed. A vehicle information output unit 43 transfers the wheel speed of the vehicle 1, an accelerator opening, the position of the brake pedal, the shift position, the state of the on-off switch for the travel control device, the steering angle of the steering wheel and the acceleration or deceleration, as vehicle information, to the system state selection unit 23 or the control decision information calculation unit 24. The vehicle speed calculation unit 40, the steering angle calculation unit 41, the acceleration/deceleration calculation unit 42 and the vehicle information output unit 43 can be configured as a portion of the vehicle control device 2 of FIG. 1. Of course, a processing unit which is different from the vehicle control device 2 is prepared, and a CPU in the processing unit executes a previously stored computer program. This may implement operation of the vehicle speed calculation unit 40, the steering angle calculation unit 41, the acceleration/deceleration calculation unit 42 and the vehicle information output unit 43.

Figure 10:
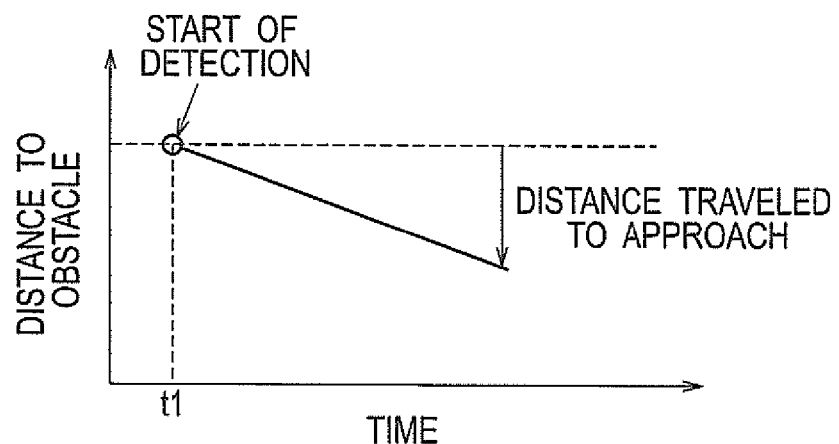
FIG. 10 is a graph showing a distance by which the obstacle approaches a vehicle since the time (t1) of start of detection of the obstacle by the side obstacle detection sensors.

A detailed example of a configuration of the surrounding information acquisition unit 22 will be described with reference to FIG. 4. The surrounding information acquisition unit 22 includes the front obstacle detection sensors 13a to 13d, 19e, the rear obstacle detection sensors 13e to 13h, and the side obstacle detection sensors 19a to 19d, which are installed on the front, rear and lateral sides of the vehicle 1 illustrated in FIG. 1 so as to be configured as a surrounding obstacle detection sensor 37. A relative distance calculation unit 39 performs filtering processing on a value of a distance from an obstacle detected by the surrounding obstacle detection sensor 37, as needed. Further, the relative distance calculation unit 39 calculates a distance by which the obstacle approaches the vehicle since the time (t1) of start of detection of the obstacle by the side obstacle detection sensors 19a to 19d, as illustrated in FIG. 10. A relative speed estimation unit 38 estimates a relative speed with respect to the obstacle from the distance to the obstacle detected by the side obstacle detection sensors 19a to 19d. The sign of the relative speed is such that a positive sign indicates a direction in which the obstacle approaches the vehicle 1 and a negative sign indicates a direction in which the obstacle moves away from the vehicle 1. Further, the relative speed estimation unit 38 calculates the time (or approach time) required for the obstacle to approach the vehicle 1 from the distance to the obstacle and the relative speed. The approach time may be determined for example by obtaining TTC (Time-To-Collision) by dividing the distance to the obstacle by the relative speed. A presence-or-absence-of-obstacle decision unit 44 outputs a signal indicating whether or not the surrounding obstacle detection sensor 37 has detected the obstacle. A surrounding information output unit 45 transfers the presence or absence of a possible obstacle which may be present at the front side PD, the rear side and the lateral sides of the vehicle 1, the distance to the obstacle and the relative speed, and the approach time and a direction or angle of detection of the obstacle to be described later, as surrounding information, to the system state selection unit 23 or the control decision information calculation unit 24. The relative distance calculation unit 39, the relative speed estimation unit 38, the presence-or-absence-of-obstacle decision unit 44 and the surrounding information output unit 45 can be configured as a portion of the vehicle control device 2 of FIG. 1. Of course, a processing unit which is different from the vehicle control device 2 is prepared, and a CPU in the processing unit executes a previously stored computer program. This may implement operation of the relative distance calculation unit 39, the relative speed estimation unit 38, the presence-or-absence-of-obstacle decision unit 44 and the surrounding information output unit 45.

The system state selection unit 23 determines whether to set the system state to the on or off state, based on the state of the on-off switch for the travel control device detected by the SW operation recognition unit 3.

Figure 7:
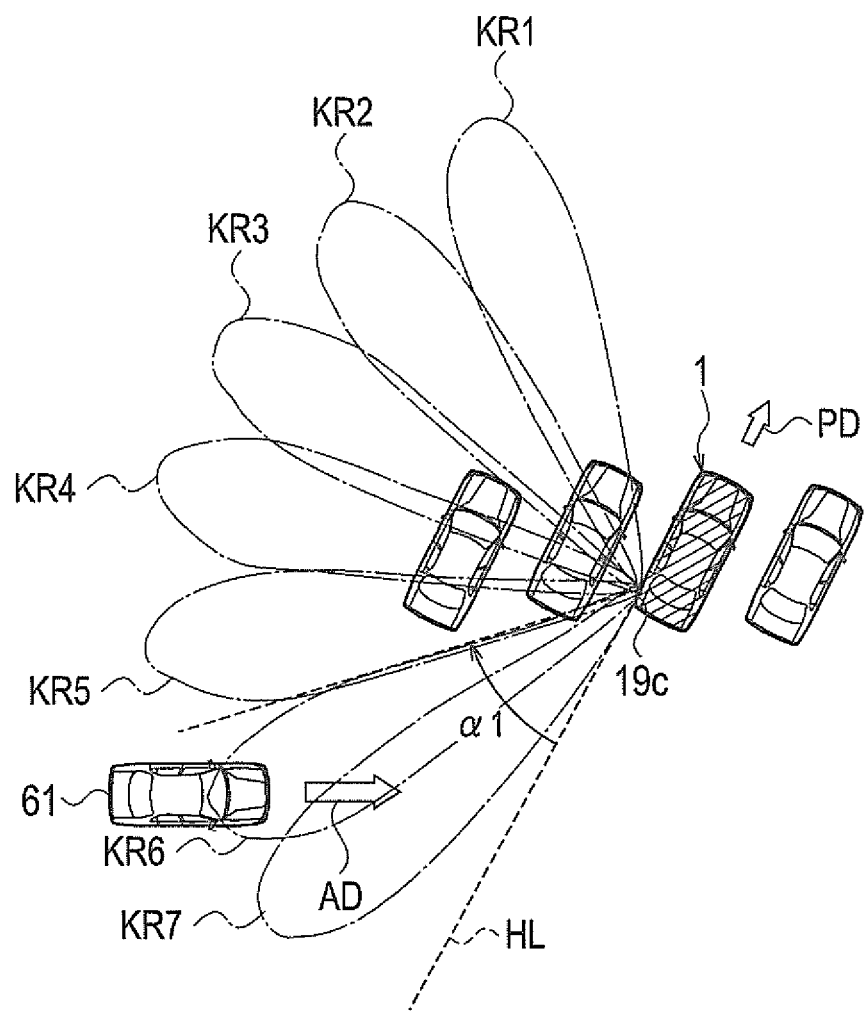
FIG. 7 is a plan view illustrating a lateral side detection region in which a side obstacle detection sensor 19c can detect an obstacle, and an example of a predetermined detection angle area.

Description will be given with reference to FIG. 7 with regard to a lateral side detection region, taking the side obstacle detection sensor 19c as an example. The side obstacle detection sensor 19c installed on a rear fender of the vehicle 1 on the left side thereof toward the rear thereof can detect an obstacle 61 entering a sector-shaped region (or the lateral side detection region) with a predetermined angle, including the lateral side of the vehicle 1, and ranging from the lateral side to the rear side of the vehicle 1, centered about the side obstacle detection sensor 19c. The side obstacle detection sensor 19c divides the lateral side detection region into plural detection angle areas KR1 to KR7, and detects, for each of the plural detection angle areas KR1 to KR7, an obstacle entering the detection angle area and a distance to the obstacle. Which of the detection angle areas KR1 to KR7 the obstacle is detected in can be determined for example by horizontally scanning electromagnetic waves in the lateral side detection region. The number of areas divided is not limited to seven but may be set less or more than seven. Incidentally, the other side obstacle detection sensors 19a, 19b, 19d are the same as the side obstacle detection sensor 19c. Here, the laterals or sides of the vehicle 1 refers to sides in a direction perpendicular to the parking direction PD of the vehicle 1, and FIG. 7 illustrates a left side as the lateral side. The rear of the vehicle 1 refers to a side in a direction rotated 180° with respect to the parking direction PD of the vehicle 1. The boundary of the plural detection angle areas KR1 to KR7 on the rear side is located on the lateral side of a half-line HL extending rearward from the side obstacle detection sensor 19c.

Figure 5:
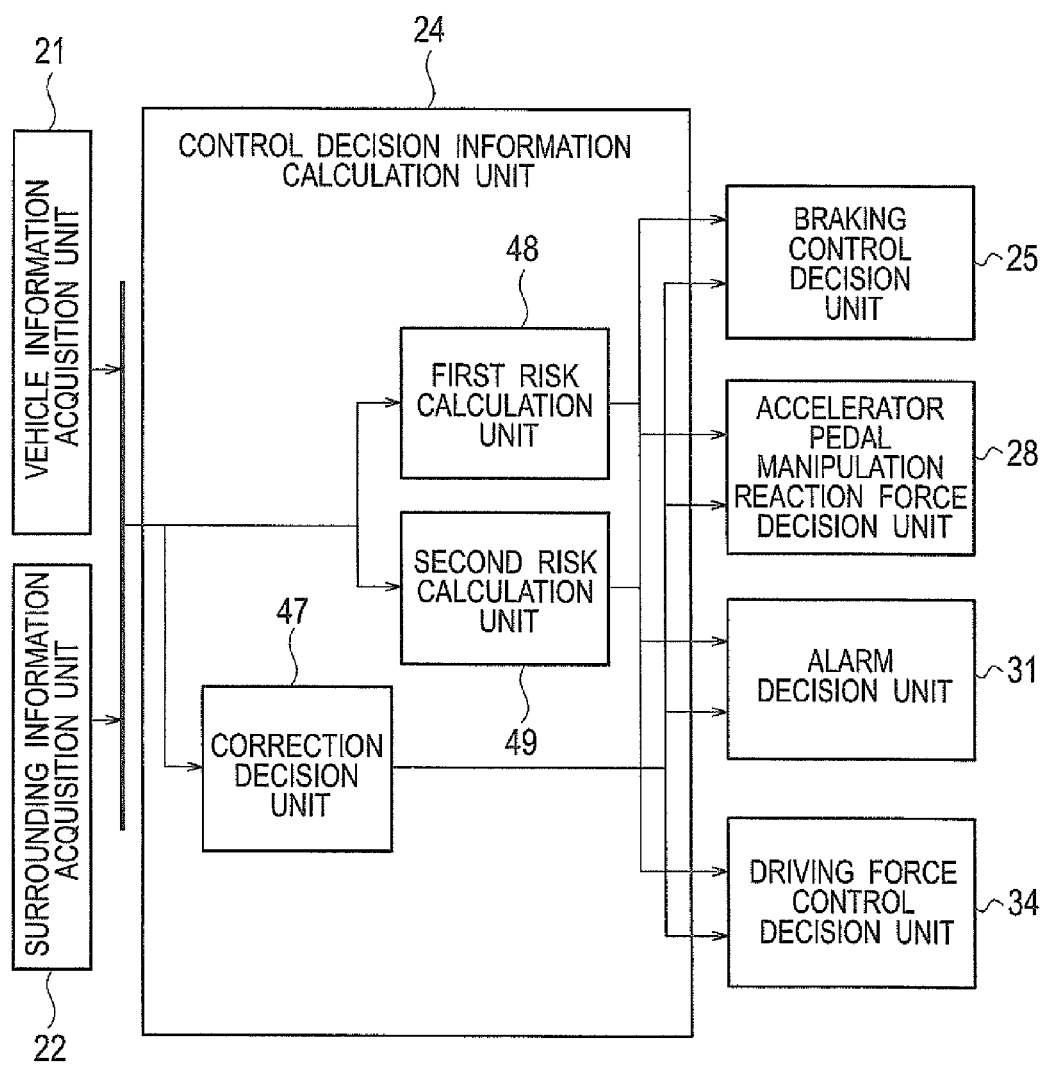
FIG. 5 is a block diagram illustrating a specific example of a configuration of a control decision information calculation unit 24 of FIG. 2.

A specific example of a configuration of the control decision information calculation unit 24 of FIG. 2 will be described with reference to FIG. 5. The control decision information calculation unit 24 includes a first risk calculation unit 48 which calculates a first risk as a criterion of judgment of warning, a second risk calculation unit 49 which calculates a second risk (or an activation threshold) as a criterion of judgment of warning, and a correction decision unit 47 (or a threshold control unit) which corrects the second risk so as to advance the timing of warning, when a condition to be described later is satisfied. Results calculated by the first risk calculation unit 48 and the second risk calculation unit 49 are transmitted to a braking control decision unit 25, an accelerator pedal manipulation reaction force decision unit 28, an alarm decision unit 31, and a driving force control decision unit 34. The correction decision unit 47 corrects the second risk transmitted to the braking control decision unit 25, the accelerator pedal manipulation reaction force decision unit 28, the alarm decision unit 31, and the driving force control decision unit 34.

The first risk calculation unit 48 first calculates a base value of the first risk. The base value of the first risk is used as a reference value to determine whether or not to provide warning based on a distance to an obstacle detected by the rear obstacle detection sensors 13e to 13h. The base value of the first risk is a distance which varies according to the vehicle speed. For example, the higher vehicle speed leads to the larger base value of the first risk. When the vehicle speed is equal to zero, the base value of the first risk may be offset to take on a predetermined value. Also, the base value of the first risk may be changed according to the approach time calculated by the relative speed estimation unit 38. Therefore, for example, the first risk calculation unit 48 may calculate the base value of the first risk from the vehicle speed and the approach time by referring to data indicating a relationship between the vehicle speed and the base value of the first risk and data indicating a relationship between the approach time and the base value of the first risk.

Then, the first risk calculation unit 48 calculates the first risk for each warning control from the base value of the first risk by using a coefficient for each warning control. For example, the first risk for each warning control can be calculated by varying weights for each warning control by multiplying the base value by a coefficient R1_K1 for braking control, multiplying the base value by a coefficient R1_K2 for accelerator pedal manipulation reaction force control, multiplying the base value by a coefficient R1_K3 for alarm control, and multiplying the base value by a coefficient R1_K4 for driving force control. For example, the coefficients are set to values which lie between 0 and 1 inclusive, and are such that the following relationship is established: $R1\_K1 \leq R1\_K2 \leq R1\_K4 \leq R1\_K3$. This enables weighting such that the alarm, the driving force control, the accelerator pedal manipulation reaction force control, and the braking control are performed in this order.

The second risk calculation unit 49 first calculates a base value of the second risk. The base value of the second risk includes a base value of the second risk (the distance) and a base value of the second risk (the approach time). The base value of the second risk (the distance) is used as a reference value to determine whether or not to provide warning based on a distance to an obstacle detected by the side obstacle detection sensors 19a to 19d. The base value of the second risk (the approach time) is used as a reference value to determine whether or not to provide warning based on the approach time calculated by the relative speed estimation unit 38. The base value of the second risk (the distance) varies according to the vehicle speed. Specifically, in the same manner as the first risk (the distance), the higher vehicle speed leads to the larger base value of the second risk (the distance). For example, the second risk calculation unit 49 can calculate the base value of the second risk (the distance) from the vehicle speed by referring to data indicating a relationship between the vehicle speed and the base value of the second risk (the distance). Also, the base value of the second risk (the distance) may be set to a different value from the base value of the first risk. In this case, it is desirable that the base value of the second risk (the distance) be set to a larger value than the base value of the first risk. When the vehicle speed is equal to zero, the base value of the second risk (the distance) may be offset to take on a predetermined value. Also, the base value of the second risk (the distance) may be changed according to the approach time calculated by the relative speed estimation unit 38.

Then, the second risk calculation unit 49 calculates the second risk (the distance) and the second risk (the approach time) for each warning control from the base value of the second risk (the distance) and the base value of the second risk (the approach time) by using a coefficient for each warning control. For example, the second risk (the distance) and the second risk (the approach time) for each control are calculated by varying weights for each control by multiplying the base value by a coefficient R2_K1 for braking control, multiplying the base value by a coefficient R2_K2 for accelerator pedal manipulation reaction force control, multiplying the base value by a coefficient R2_K3 for alarm control, and multiplying the base value by a coefficient R2_K4 for driving force control. For example, the coefficients are set to values which lie between 0 and 1 inclusive, and are such that the following relationship is established: R2_K1≤R2_K2≤R2_K4≤R2_K3. This enables weighting such that the alarm, the driving force control, the accelerator pedal manipulation reaction force control, and the braking control are performed in this order.

The correction decision unit 47 corrects the second risk so as to advance the timing of warning, if an obstacle is detected when the vehicle 1 moves rearward from its position parked obliquely relative to a driving lane. This suppresses a delay in warning or unwarned conditions, thereby reducing a driver's uneasy feeling. Specifically, if (or under a condition A-1) the shift position detection unit 9 detects the rearward movement (R) position and as illustrated for example in FIG. 7 the obstacle 61 is detected in the predetermined detection angle areas KR7, KR6 before being detected in the other detection angle areas KR5 to KR1, the correction decision unit 47 raises the second risk so that the timing of warning can become earlier than if the obstacle 61 is detected first in the other detection angle areas KR5 to KR1. In the embodiment, if the shift position detection unit 9 detects the rearward movement (R) position and, as illustrated for example in FIG. 7, the obstacle 61 is detected in the predetermined detection angle areas KR7, KR6 before being detected in the other detection angle areas KR5 to KR1, the correction decision unit 47 corrects the second risk to a large value thereby to advance the timing of warning. Meanwhile, if the shift position detection unit 9 does not detect the rearward movement (R) position, or for example if the obstacle 61 is not detected in the predetermined detection angle areas KR7, KR6 before being detected in the other detection angle areas KR5 to KR1, the correction decision unit 47 makes no correction on the second risk calculated by the second risk calculation unit 49.

A first example of a method for correcting the second risk is to multiply the second risk by a correction gain which is a number equal to or more than 1. The timing of warning can be uniformly advanced by correcting the second risk to a large value by multiplying the second risk by the number (for example, 2) equal to or more than 1, as the correction gain which is a fixed value.

Figure 9:
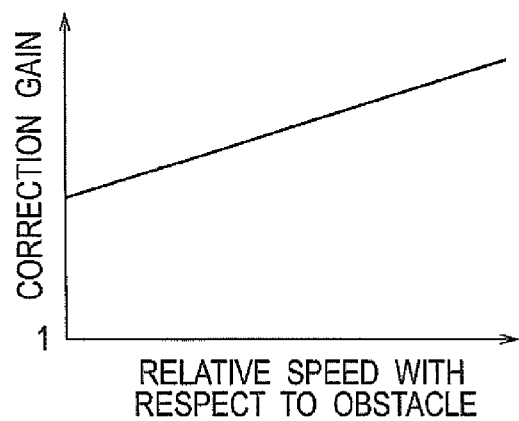
FIG. 9 is a graph showing an example of a relationship between a relative speed with respect to the obstacle and a correction gain.

In a second example of the method for correcting the second risk, the correction gain is not set to the fixed value but may be set larger as the relative speed with respect to the obstacle estimated by the relative speed estimation unit 38 becomes higher, as illustrated in FIG. 9. As the relative speed with respect to the obstacle becomes higher, the driver feels that the normal timing of warning is later. Therefore, warning control which achieves less uneasy feeling can be performed by providing the earlier timing of warning as the relative speed with respect to the obstacle becomes higher.

The "predetermined detection angle area" refers to one or more detection angle areas on the rear side among the plural detection angle areas KR1 to KR7 detectable with the side obstacle detection sensor 19*c*. In the example illustrated in FIG. 7, the "predetermined detection angle area" refers to the detection angle areas KR7, KR6 located within a first angle range α1. The "first angle range α1" refers to a range extending, with the side obstacle detection sensor 19*c* centered, to the lateral side of the vehicle 1 from the half-line HL extending from the side obstacle detection sensor 19*c* rearward of the vehicle 1. Desirably, the first angle range α1 is set within a range of 30 to 80 degrees inclusive. The first angle range α1 corresponds to an angle which a parking line forms with respect to the driving lane when the vehicle 1 is parked along the parking line drawn obliquely relative to the driving lane. In the example of FIG. 7, the detection angle areas KR7, KR6 are illustrated as being included in the first angle range α1; however, the first angle range α1 may be expanded to include the detection angle areas KR7, KR6, KR5. In this case, KR4 to KR1 are set as the other detection angle areas.

Figure 8:
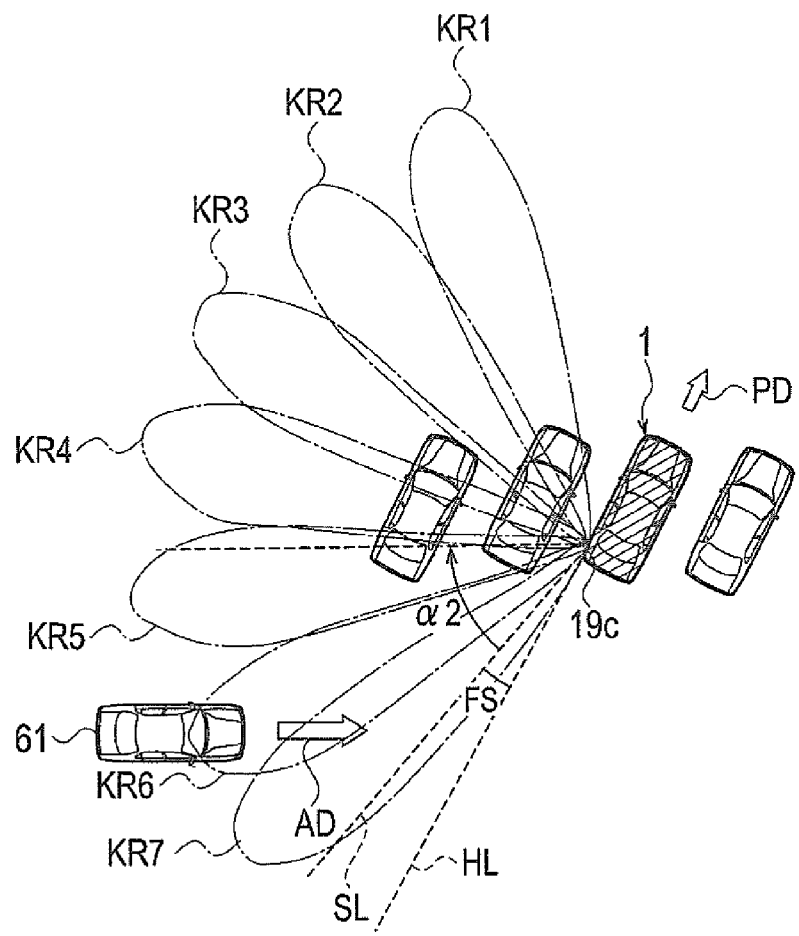
FIG. 8 is a plan view illustrating another example of the predetermined detection angle area.

Another more detailed example of the "predetermined detection angle area" is illustrated in FIG. 8. In FIG. 8, the "predetermined detection angle area" refers to the detection angle areas KR7, KR6, KR5 located in a second angle range α2 extending from a boundary line SL toward the lateral side of the vehicle 1. The "boundary line SL" refers to a line to which the half-line HL extending from the side obstacle detection sensor 19*c* rearward of the vehicle 1 is offset, with the side obstacle detection sensor 19*c* centered, toward the lateral side of the vehicle 1 by a predetermined offset angle FS. In the case of FIG. 8, KR4 to KR1 are set as the other detection angle areas. Desirably, the offset angle FS is set within a range of 10 to 20 degrees inclusive, and desirably, the second angle range α2 is set within a range of 30 to 60 degrees inclusive.

In addition to the above-described condition A-1, further, the correction decision unit 47 may correct the second risk so as to advance the timing of warning, only if (or under a condition A-2) a distance by which the obstacle 61 approaches the vehicle 1 since the start of detection of the obstacle 61 in the predetermined detection angle areas KR7, KR6 exceeds a first approach threshold. When a vehicle temporarily enters the predetermined detection angle areas KR7, KR6 but drives past the vehicle 1 without approaching the vehicle 1, the driver does not feel that the normal timing of warning is late, and thus, warning control which achieves still less uneasy feeling can be performed.

Alternatively, in place of the above-described condition A-1, the condition A-2 may be used for judgment. Specifically, if the shift position detection unit 9 detects the rearward movement (R) position and the distance by which the obstacle 61 approaches the vehicle 1 since the start of detection of the obstacle 61 in the predetermined detection angle areas KR7, KR6 exceeds the first approach threshold, the correction decision unit 47 may correct the second risk so as to advance the timing of warning.

Even if the correction decision unit 47 temporarily determines to correct the second risk so as to advance the timing of warning, if thereafter a given cancel condition is satisfied, the correction decision unit 47 may cancel correction of the second risk, or equivalently, restore the second risk to its value before the correction. For example, if (or under a condition B-1) an obstacle is detected in the other detection angle areas KR5 to KR1, or if (or under a condition B-2) the distance by which the obstacle approaches the vehicle 1 since the start of detection of the obstacle in the predetermined detection angle areas KR7, KR6 is less than a second approach threshold, the correction of the second risk may be canceled. When the condition B-1 or the condition B-2 is satisfied, the driver feels little that the normal timing of warning is late. In these cases, thus, warning control which achieves still less uneasy feeling can be performed by canceling the correction of the second risk.

Returning to FIG. 2, the braking force generation system (25 to 27) includes the braking control decision unit 25 which determines whether or not to perform braking force control to give a warning of the approach of an obstacle, a braking control unit 26, and the braking force generation device 27 which performs the braking force control to give the warning of the approach of the obstacle under control by the braking control unit 26. The accelerator pedal manipulation reaction force generation system (28 to 30) includes the accelerator pedal manipulation reaction force decision unit 28 which determines whether or not to perform accelerator pedal manipulation reaction force control to give the warning of the approach of the obstacle, an accelerator pedal manipulation reaction force control unit 29, and the accelerator pedal manipulation reaction force generation device 30 which performs the accelerator pedal manipulation reaction force control to give the warning of the approach of the obstacle under control by the accelerator pedal manipulation reaction force control unit 29. The alarm system (31 to 33) includes the alarm decision unit 31 which determines whether or not to give an alarm to the driver to give the warning of the approach of the obstacle, an alarm control unit 32, and the alarm device 33 which gives the alarm to the driver to give the warning of the approach of the obstacle under control by the alarm control unit 32. The driving force generation system (34 to 36) includes the driving force control decision unit 34 which determines whether or not to perform driving force control to give the warning of the approach of the obstacle, a driving force control unit 35, and the driving force generation device 36 which performs the driving force control to give the warning of the approach of the obstacle under control by the driving force control unit 35.

The first risk, the second risk (the distance) and the second risk (the approach time) calculated for each control are transmitted to the braking control decision unit 25, the accelerator pedal manipulation reaction force decision unit 28, the alarm decision unit 31, and the driving force control decision unit 34.

The braking control decision unit 25 determines to generate a braking force to give the warning of the approach of the obstacle, when any of conditions A01 to A03 described below is established. It is to be here noted that the distance to the obstacle detected by the rear obstacle detection sensors 13e to 13h is referred to as a "rear sensor detected distance," the distance to the obstacle detected by the side obstacle detection sensors 19a to 19d is referred to as a "side sensor detected distance," and the approach time determined from the side obstacle detection sensors 19a to 19d is referred to as "side sensor approach time." The first risk, the second risk (a distance value) and the second risk (the approach time) obtained by multiplying their base values by the coefficient R1_K1 or R2_K1 for the braking control are referred to as the first risk for braking, the second risk (the distance value) for braking and the second risk (the approach time) for braking, respectively.

A01: the first risk for braking>the rear sensor detected distance

A02: the second risk (the distance value) for braking>the side sensor detected distance A03: the second risk (the approach time) for braking>the side sensor approach time When the braking control decision unit 25 determines to activate warning by braking, the braking control unit 26 increases a brake pressure at a predetermined rate of change, and then, when a predetermined target brake pressure is reached, the braking control unit 26 maintains the brake pressure as it is. When hold time reaches a predetermined time (for example, 0.8 seconds), or when a predetermined time elapses after the vehicle speed has become equal to 0, the brake pressure is reduced to 0 at a predetermined rate of change. Incidentally, the predetermined rate of change and the predetermined target brake pressure may both be changed according to the vehicle speed or the distance to the obstacle. The braking force generation device 27 controls actual brake pressures on the wheels 20a to 20d so as to achieve the target brake pressure calculated by the braking control unit 26.

The accelerator pedal manipulation reaction force decision unit 28 determines to generate an accelerator pedal manipulation reaction force to give the warning of the approach of the obstacle, when any of conditions A04 to A06 described below is established. It is to be here noted that the first risk, the second risk (the distance value) and the second risk (the approach time) obtained by multiplying their base values by the coefficient R1_K2 or R2_K2 for the accelerator pedal manipulation reaction force are referred to as the first risk for APD, the second risk (the distance value) for APD and the second risk (the approach time) for APD, respectively.

A04: the first risk for APD>the rear sensor detected distance

A05: the second risk (the distance value) for APD>the side sensor detected distance A06: the second risk (the approach time) for APD>the side sensor approach time When the accelerator pedal manipulation reaction force decision unit 28 determines to generate the accelerator pedal manipulation reaction force, the accelerator pedal manipulation reaction force control unit 29 increases a reaction force command value at a predetermined rate of change, and then, when a predetermined reaction force command value is reached, the accelerator pedal manipulation reaction force control unit 29 maintains the reaction force command value as it is. When hold time reaches a predetermined time (for example, 0.8 seconds), the reaction force command value is reduced to 0 at a predetermined rate of change. Incidentally, the predetermined rate of change and the predetermined reaction force command value may both be changed according to the vehicle speed or the distance to the obstacle. The accelerator pedal manipulation reaction force generation device 30 controls the manipulation reaction force of the accelerator pedal so as to achieve the reaction force command value calculated by the accelerator pedal manipulation reaction force control unit 29.

The alarm decision unit 31 determines to give an alarm by a sound or a buzzer or the like to give the warning of the approach of the obstacle, when any of conditions A07 to A09 described below is established. It is to be here noted that the first risk, the second risk (the distance value) and the second risk (the approach time) obtained by multiplying their base values by the coefficient R1_K3 or R2_K3 for the alarm are referred to as the first risk for alarm, the second risk (the distance value) for alarm and the second risk (the approach time) for alarm, respectively.

A07: the first risk for alarm>the rear sensor detected distance

A08: the second risk (the distance value) for alarm>the side sensor detected distance A09: the second risk (the approach time) for alarm>the side sensor approach time When the alarm decision unit 31 determines to give the alarm, the alarm control unit 32 repeatedly turns on and off a buzzer driving signal for a predetermined time. The alarm device 33 gives the alarm based on the buzzer driving signal calculated by the alarm control unit 32. For example, a predetermined beep is repeatedly emitted. Alternatively, the alarm may be continuously sounded while any of the above-described conditions is satisfied. Further, simultaneously with the alarm, a light emitter such as an indicator installed in a meter may flash on and off.

The driving force control decision unit 34 determines to perform the driving force control to give the warning of the approach of the obstacle, when any of conditions A10 to A12 described below is established. It is to be here noted that the first risk, the second risk (the distance value) and the second risk (the approach time) obtained by multiplying their base values by the coefficient R1_K4 or R2_K4 for the driving force are referred to as the first risk for driving force, the second risk (the distance value) for driving force and the second risk (the approach time) for driving force, respectively.

A10: the first risk for driving force>the rear sensor detected distance

A11: the second risk (the distance value) for driving force>the side sensor detected distance A12: the second risk (the approach time) for driving force>the side sensor approach time When the driving force control decision unit 34 determines to perform the driving force control, the driving force control unit 35 increases the amount of reduction in the accelerator opening at a predetermined rate of change. When the amount of reduction in the accelerator opening reaches a predetermined value, the amount of reduction is maintained as it is. When the amount of reduction is maintained for a predetermined time, the amount of reduction in the accelerator opening is reduced to 0. The final throttle opening of the engine has a value obtained by subtracting the amount of reduction in the accelerator opening calculated by the driving force control unit 35 from the accelerator opening operated by the driver. Incidentally, the predetermined rate of change and the predetermined value of the amount of reduction in the accelerator opening may both be changed according to the vehicle speed or the distance to the obstacle. The driving force generation device 36 controls engine power based on the final throttle opening of the engine calculated by the driving force control unit 35.

In this manner, warning is determined based on the obstacle's approach time, and thereby, the warning of an obstacle can be provided when the obstacle is approaching the vehicle 1 at high speed even if there is a great distance to the obstacle detected by the rear obstacle detection sensors 13e to 13h or the side obstacle detection sensors 19a to 19d. This enables recognizing a potential danger of the obstacle, thus providing the properly timed warning.

Figure 2:
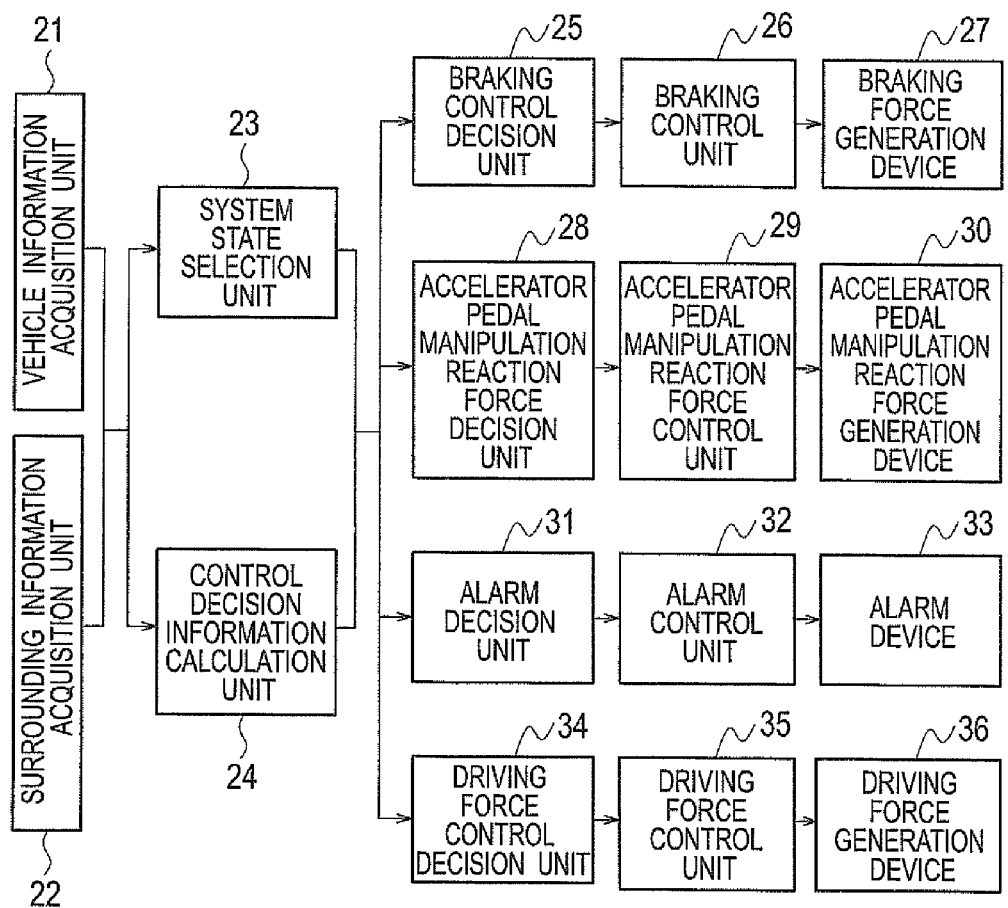
FIG. 2 is a block diagram illustrating a configuration of the travel control device according to the embodiment.

Incidentally, the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35, illustrated in FIG. 2 can be configured as a portion of the vehicle control device 2 of FIG. 1. Of course, a processing unit which is different from the vehicle control device 2 is prepared, and a CPU in the processing unit executes a previously stored computer program. This may implement operation of the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35.

[Travel Control Operation]

At the time of rearward movement of the vehicle 1, a control unit of the travel control device having the above-described configuration executes travel control operation described below, thereby enabling properly timed warning about an obstacle detected by the side obstacle detection sensor 19c. Description will be given below with reference to a flowchart of FIG. 6 with regard to how the travel control device operates when executing the travel control operation.

Figure 6:
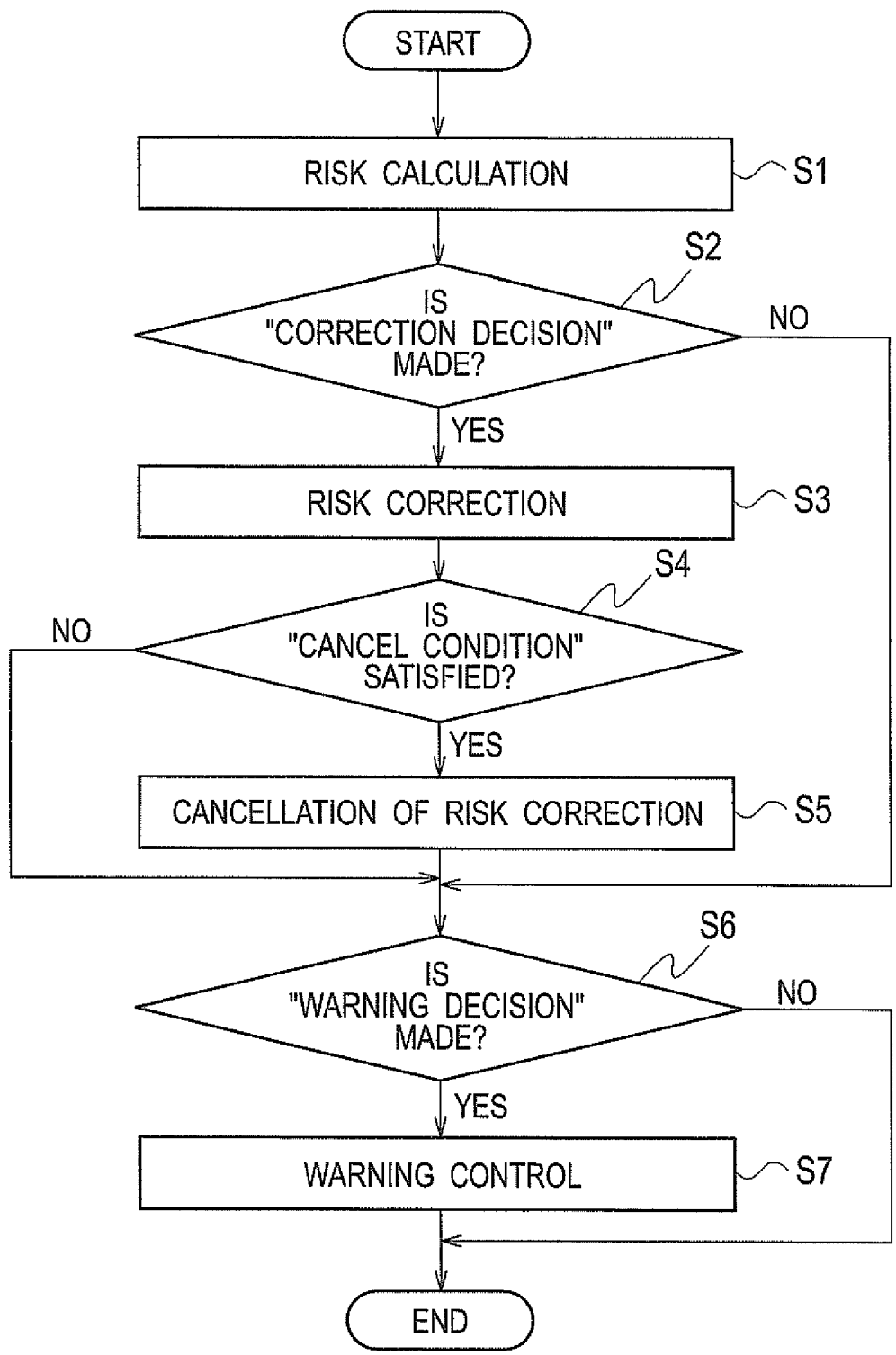
FIG. 6 is a flowchart illustrating how the travel control device operates when executing travel control operation.

The flowchart of FIG. 6 starts at the time when the system state selection unit 23 determines that the on-off switch for the travel control device is in the on state and the shift position detection unit 9 determines that the shift position of the vehicle 1 is located in the R (rearward movement) position, and the travel control operation goes to step S1 to perform processing. Then, the travel control operation is repeatedly executed so long as the on-off switch for the travel control device is in the on state and the shift position of the vehicle 1 is located in the R position. Also, the timing of start of the travel control operation is not limited to the above-described condition; besides the above-described condition, a condition such for example as where the vehicle speed is equal to or less than a predetermined value or the steering angle of the steering wheel is equal to or less than a predetermined value may be added.

In the processing of step S1, the first risk calculation unit 48 and the second risk calculation unit 49 determine the first risk or the second risk for each warning control. Specifically, the first risk for braking, the second risk (the distance value) for braking, the second risk (the approach time) for braking, the first risk for APD, the second risk (the distance value) for APD, the second risk (the approach time) for APD, the first risk for alarm, the second risk (the distance value) for alarm, the second risk (the approach time) for alarm, the first risk for driving force, the second risk (the distance value) for driving force, and the second risk (the approach time) for driving force are calculated.

In processing of step S2, the correction decision unit 47 determines whether or not the shift position detection unit 9 detects the rearward movement (R) position and as illustrated for example in FIG. 7 the obstacle 61 is detected in the predetermined detection angle areas KR7, KR6 before being detected in the other detection angle areas KR5 to KR1. When at least the condition A-1 is satisfied (YES at step S2), the operation goes to step S3 to correct the second risk calculated at step S1 so that the timing of warning can become earlier than when the obstacle 61 is detected first in the other detection angle areas KR5 to KR1. When the condition A-1 is not satisfied (NO at step S2), the operation does not correct the second risk but goes to step S4.

In processing of step S4, the correction decision unit 47 determines whether or not the obstacle is detected in the other detection angle areas KR5 to KR1, and whether or not the distance by which the obstacle approaches the vehicle 1 since the start of detection of the obstacle in the predetermined detection angle areas KR7, KR6 is less than the second approach threshold. When the condition B-1 or the condition B-2 is satisfied (YES at step S4), the operation goes to step S5, and there the correction decision unit 47 cancels correction of the second risk. When neither the condition B-1 nor the condition B-2 is satisfied (NO at step S4), the operation does not cancel the correction of the second risk but goes to step S6.

In processing of step S6, the braking control decision unit 25, the accelerator pedal manipulation reaction force decision unit 28, the alarm decision unit 31, and the driving force control decision unit 34 determine whether or not to give a warning of the approach of the obstacle in accordance with the above-described conditions A01 to A12. Only when a decision is made to give the warning (YES at step S6), processing is performed at step S7 to give the warning of the approach of the obstacle.

Although description is here given taking the side obstacle detection sensor 19c as an example, any one or more of the side obstacle detection sensors 19a to 19d may replace the side obstacle detection sensor 19c for implementation.

According to the embodiment of the present invention, as described above, the following advantageous effects can be achieved.

Figure 11:
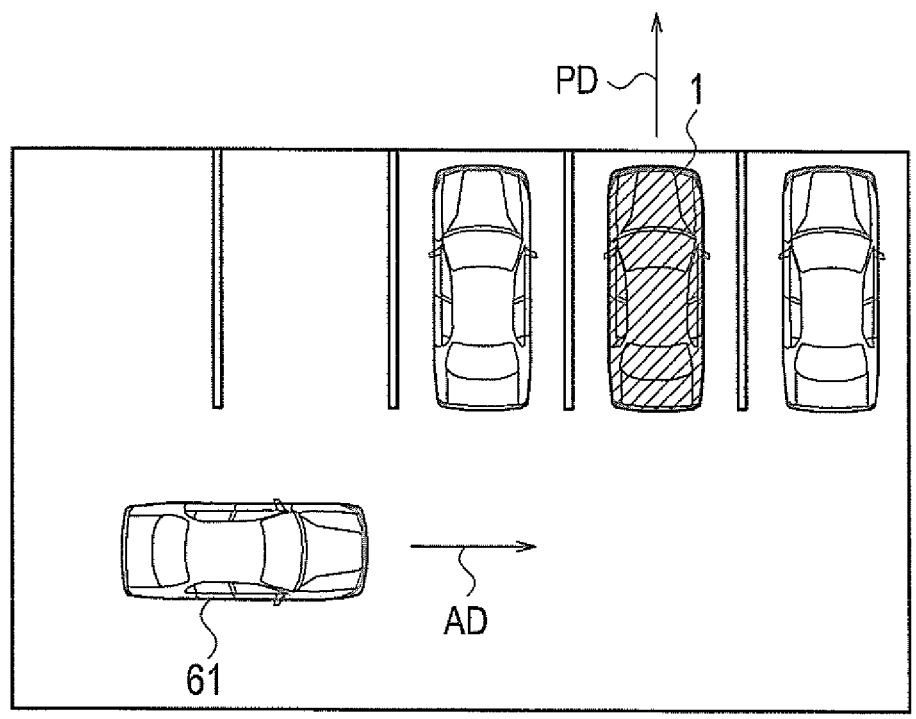
FIG. 11 is a plan view illustrating a case where a vehicle 1 is parked, from its front side, perpendicularly to a running direction AD of a vehicle 61, as an example of a situation where it is desired to cancel suppression of warning.

If the shift position detection unit 9 detects the rearward movement (R) position and the obstacle 61 is detected in the predetermined detection angle areas KR7, KR6 which are some rear side areas among the plural detection angle areas KR1 to KR7, before being detected in the other detection angle areas KR5 to KR1, the second risk is raised so that the timing of warning can become earlier than if the obstacle is detected first in the other detection angle areas KR5 to KR1. Proper warning control for driving scenes can be performed even in a situation where an angle formed by an extending direction AD of a road along which a vehicle approaching the vehicle 1 is running and the parking direction PD of the vehicle 1 is not clearly determined as illustrated in FIGS. 7 and 8. In particular when the vehicle moves rearward from its position parked obliquely relative to the driving lane, an approach speed is higher than when the vehicle 1 is parked perpendicularly to the running direction AD of the vehicle 61 as illustrated in FIG. 11, and thus the driver feels that the normal timing of warning is late. Therefore, the obstacle is detected first in the detection angle areas KR7, KR6 located in the predetermined angle range α1 extending toward the lateral side of the vehicle 1 from the half-line HL extending rearward of the vehicle 1 from the side obstacle detection sensors 19a to 19d, and thereby, the timing of warning is advanced, so that the driver's uneasy feeling can be reduced.

The predetermined detection angle areas may be located in the second angle range α2 extending from the boundary line SL toward the lateral side of the vehicle 1, as illustrated in FIG. 8. When the vehicle moves rearward from its position parked obliquely relative to the driving lane, the approaching vehicle running along the driving lane can be more properly judged, and thus, warning control which achieves still less uneasy feeling can be performed.

The correction decision unit 47 may correct the second risk so as to advance the timing of warning, only if the distance by which the obstacle 61 approaches the vehicle 1 since the start of detection of the obstacle 61 in the predetermined detection angle areas KR7, KR6 exceeds the first approach threshold. When a vehicle temporarily enters the predetermined detection angle areas KR7, KR6 but drives past the vehicle 1 without approaching the vehicle 1, the driver does not feel that the normal timing of warning is late, and thus, warning control which achieves still less uneasy feeling can be performed.

As the relative speed with respect to the obstacle becomes higher, the driver feels that the normal timing of warning is later. Therefore, warning control which achieves still less uneasy feeling can be performed by correcting the second risk so as to provide the earlier timing of warning as the relative speed with respect to the obstacle becomes higher.

If (under the condition B-1) the obstacle is detected in the other detection angle areas KR5 to KR1, or if (under the condition B-2) the distance by which the obstacle approaches the vehicle 1 since the start of detection of the obstacle in the predetermined detection angle areas KR7, KR6 is less than the second approach threshold, the correction of the second risk is canceled. When the condition B-1 or the condition B-2 is satisfied, the driver feels little that the normal timing of warning is late. In these cases, thus, warning control which achieves still less uneasy feeling can be performed by canceling the correction of the second risk.

While the contents of the present invention have been described above with reference to the embodiment and examples, it is to be understood that the present invention is not limited to these descriptions, and it would be obvious to one of ordinary skill in the art that various modifications and improvements could be made thereto.

According to the travel control device and travel control method according to the embodiment, it is possible to reduce a driver's uneasy feeling about the timing of warning when a vehicle moves rearward from its position parked obliquely relative to a driving lane. Therefore, the present invention has industrial applicability.

The invention claimed is:

1. A travel control device comprising:
a side obstacle detection unit which divides a range from a lateral side to a rear side of a vehicle into a plurality of detection angle areas, and detects, for each of the plurality of detection angle areas, an obstacle entering the detection angle area and a distance to the obstacle;
a rearward movement preparation detection unit which detects the vehicle preparing to move rearward;
a warning unit which provides warning about the obstacle detected by the side obstacle detection unit;
a warning control unit which controls the warning unit so that the warning is provided in a case where the distance to the obstacle detected by the side obstacle detection unit is equal to or less than an activation threshold for the warning; and
a threshold control unit which, if the rearward movement preparation detection unit detects the vehicle preparing to move rearward and the obstacle is detected in a predetermined detection angle area including one or more rear side areas among the detection angle areas, before being detected in the other detection angle areas, raises the activation threshold so that the timing of the warning becomes earlier than if the obstacle is detected first in the other detection angle areas.

2. The travel control device according to claim 1, wherein the predetermined detection angle area is located in an angle range extending toward the lateral side of the vehicle from a boundary line to which a half-line extending from the side obstacle detection unit rearward of the vehicle is offset, with the side obstacle detection unit centered, toward the lateral side of the vehicle by a predetermined offset angle.

3. The travel control device according to claim 1, wherein the threshold control corrects the activation threshold so as to advance the timing of the warning, only if a distance by which the obstacle approaches the vehicle since the start of detection of the obstacle in the predetermined detection angle area exceeds a first approach threshold.

4. The travel control device according to claim 1, further comprising a relative speed estimation unit which estimates a relative speed with respect to the obstacle on the basis of the distance to the obstacle detected by the side obstacle detection unit, wherein the threshold control unit corrects the activation threshold so that the earlier the timing of the warning, the higher the relative speed with respect to the obstacle.

5. The travel control device according to claim 1, wherein the correction of the activation threshold is canceled if the obstacle is detected in the other detection angle areas, or if the distance by which the obstacle approaches the vehicle since the start of detection of the obstacle in the predetermined detection angle area is less than a second approach threshold.

6. A travel control method using a travel control device including: a side obstacle detection unit which divides a range from a lateral side to a rear side of a vehicle into a plurality of detection angle areas, and detects, for each of the plurality of detection angle areas, an obstacle entering the detection angle area and a distance to the obstacle; a rearward movement preparation detection unit which detects the vehicle preparing to move rearward; and a warning unit which provides warning about the obstacle detected by the side obstacle detection unit, the method comprising:

controlling the warning unit so that the warning is provided if the distance to the obstacle detected by the side obstacle detection unit is equal to or less than an activation threshold for the warning; and if the rearward movement preparation detection unit detects the vehicle preparing to move rearward and the obstacle is detected in a predetermined detection angle area including one or more rear side areas among the plurality of detection angle areas, before being detected in the other detection angle areas, raising the activation threshold so that the timing of the warning becomes earlier than if the obstacle is detected first in the other detection angle areas.

7. A travel control device comprising:

side obstacle detecting means for dividing a range from a lateral side to a rear side of a vehicle into a plurality of detection angle areas, and for detecting, for each of the plurality of detection angle areas, an obstacle entering the detection angle area and a distance to the obstacle;

rearward movement preparation detecting means for detecting the vehicle preparing to move rearward;

warning means for providing warning about the obstacle detected by the side obstacle detecting means;

warning controlling means for controlling the warning means so that the warning is provided in a case where the distance to the obstacle detected by the side obstacle detecting means is equal to or less than an activation threshold for the warning; and threshold controlling means, if the rearward movement preparation detection unit detects the vehicle preparing to move rearward and the obstacle is detected in a predetermined detection angle area including one or more rear side areas among the detection angle areas, before being detected in the other detection angle areas, for raising the activation threshold so that the timing of the warning becomes earlier than if the obstacle is detected first in the other detection angle areas.

* * * * *